United States Patent [19]
Lee

[11] Patent Number: 5,245,220
[45] Date of Patent: Sep. 14, 1993

[54] UNIVERSAL POWER ADAPTER FOR CONVERTING AC/DC VOLTAGE TO DC VOLTAGE

[76] Inventor: Richard M. L. Lee, 7F, No. 152-1, Sec. 7, Chung Shan North Rd., Taipei, Taiwan

[21] Appl. No.: 862,134

[22] Filed: Apr. 2, 1992

[51] Int. Cl.⁵ ............................................... H02J 4/00
[52] U.S. Cl. ..................................... 307/80; 307/128; 363/37
[58] Field of Search .................. 307/43, 80, 128, 150, 307/151; 363/21, 37

[56] References Cited

U.S. PATENT DOCUMENTS

| | | | |
|---|---|---|---|
| 3,873,846 | 3/1975 | Morio et al. | 307/80 |
| 3,889,173 | 6/1975 | Klusmann et al. | |
| 3,898,474 | 8/1975 | Funatsu et al. | 307/80 |
| 4,092,709 | 5/1978 | Voigt et al. | 363/18 |
| 4,890,217 | 12/1989 | Conway | 363/143 |

*Primary Examiner*—William H. Beha, Jr.
*Attorney, Agent, or Firm*—Lowe, Price, LeBlanc & Becker

[57] ABSTRACT

A universal power adapter comprised of a standard IEC three-wire socket, an AC/DC power supply detector circuit, an AC/DC power supply selector circuit, an AC/DC power supply pre-treating circuit, a DC power supply transformer circuit, a feedback and regulating circuit, and a DC output circuit, wherein said standard IEC three-wire socket connects an AC or DC input voltage to said AC/DC power supply selector circuit and said AC/DC power supply pre-treating circuit for converting into a DC voltage via said AC/DC power supply detector circuit, said DC voltage being treated through said DC power supply transformer circuit and said feed back and regulating circuit to provide a DC working voltage for output through an output device.

4 Claims, 4 Drawing Sheets

UNIVERSAL POWER ADAPTER FOR CONVERTING AC/DC VOLTAGE TO DC VOLTAGE

BACKGROUND OF THE INVENTION

The present invention relates to electric power adapters, and more particularly, the present invention relates to a universal power adapter which is compact and lightweight, and which provides DC power supply to any of a variety of portable electric apparatus.

A variety of portable DC power-operated apparatus, including portable computers, video camera and machine tools, are known and widely in use for the advantage of mobility. In using a portable DC power-operated apparatus, DC power supply is generally obtained from dry batteries or a car battery power supply. However, the car battery power supply of a motor vehicle is not suitable for all portable DC power-operated apparatus. Therefore, a power adapter may be required for connecting a DC power supply to a portable DC power-operated apparatus.

SUMMARY OF THE INVENTION

The present invention has been accomplished under the aforesaid circumstances. According to the present invention, a standard IEC three-wire socket is used to obtain a car battery power supply, permitting it to be treated through an internal circuit assembly and converted into the desired DC power supply. Because an AC socket is used, AC power supply can be obtained and treated into the desired DC power supply. Therefore, any input DC/AC power supply can be converted into the desired DC voltage for any of a variety of portable DC power-operated apparatus.

DETAILED DESCRIPTION OF THE PREFERRED EMBODIMENTS

Figure 1:
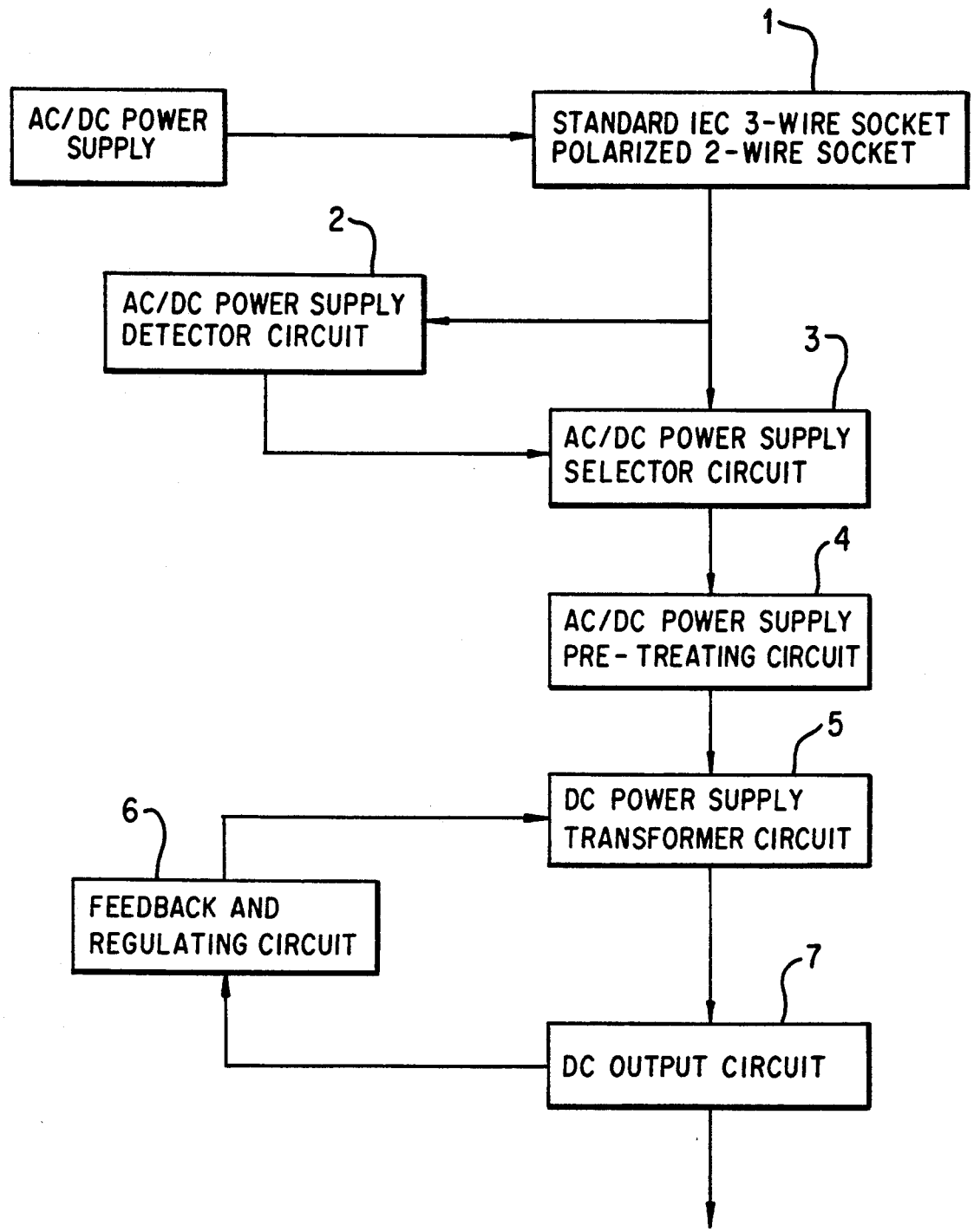
FIG. 1 is a circuit block diagram according to the present invention.
Figure 2:
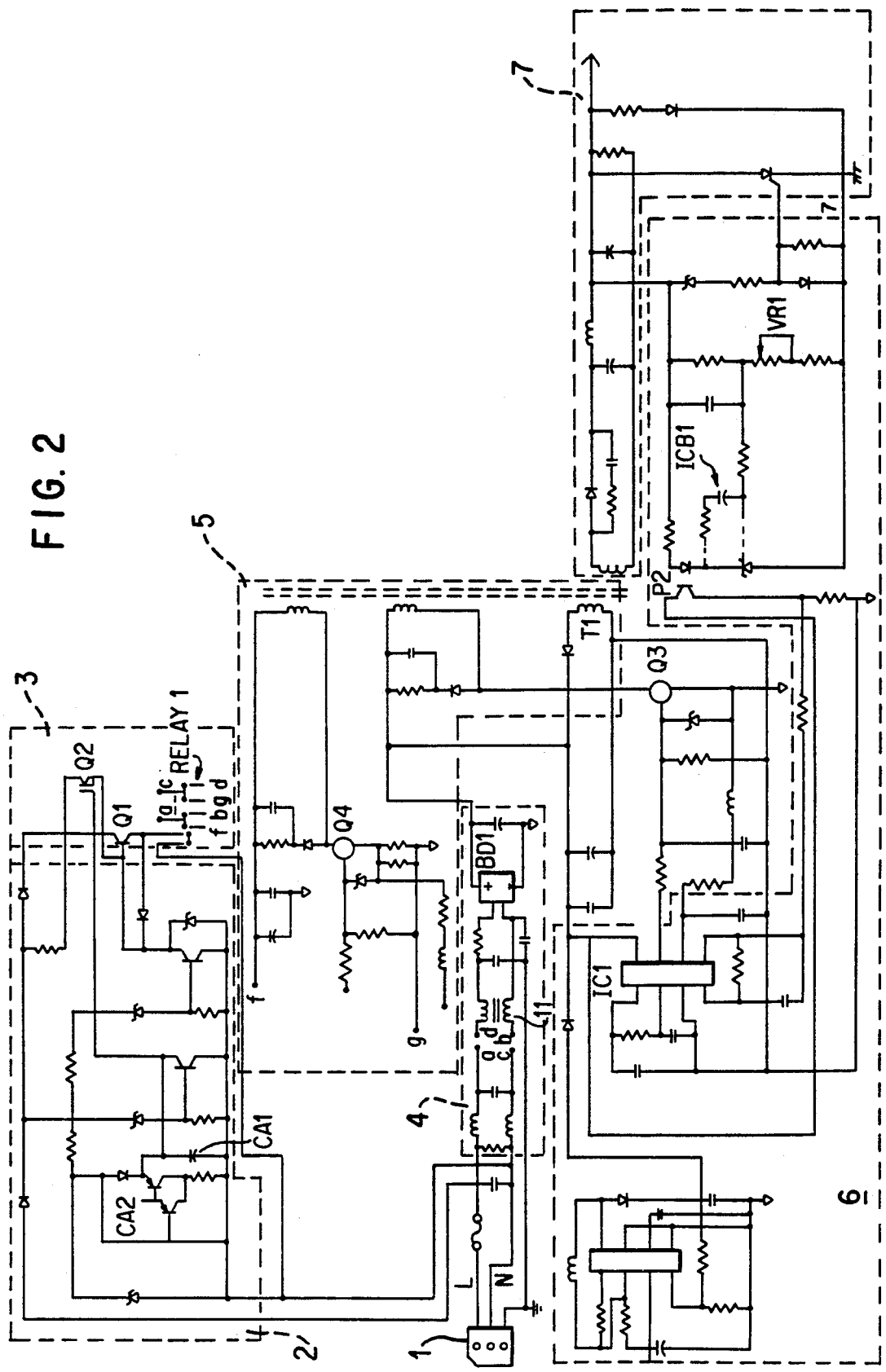
FIG. 2 is a circuit diagram according to the present invention.

Referring to FIGS. 1 and 2, the present invention is comprised of a standard IEC three-wire socket 1, an AC/DC power supply detector circuit 2, an AC/DC power supply selector circuit 3, an AC/DC power supply pre-treating circuit 4, a DC power supply transformer circuit 5, a feedback and regulating circuit 6, and a DC output circuit 7.

The standard IEC three-wire socket 1, which is suitable for a regular computer three-pin plug, is to obtain an external AC voltage suitable. Alternatively, a two-wire polarized AC socket may be used for connecting a two-wire electric plug.

The AC/DC power supply detector circuit 2 is to detect an AC or DC power supply input according to the frequency of the input voltage. When a DC power supply input was detected at the power supply input terminals L.N., the capacitor CA1 is charged to High causing the transistors Q1 and Q2 to be electrically connected, and therefore, the relay 1 is not energized, and contacts a and f and contacts c and g are respectively connected. When an AC power supply input voltage was recognized, the capacitor CA1 is charged to connect the transistors Q1 and Q2 without causing the relay 1 to be energized; the capacitor CA2 is connected at negative half-wave causing the capacitor CA1 to discharge, and therefore, the relay 1 does not work under AC power supply mode, and contacts a and b and contacts c and d are kept connected. The AC/DC power supply detector circuit 2 consumes less power. Power consumption is as low as 0.5 W. Therefore, power loss at the posterior circuits can be minimized. The transistors are designed to protect against high voltage. Input voltage ranging from 90 VAC–265 VAC or from 9 V–26 VDC is acceptable. Therefore, any city power supply or car battery power supply can be used.

The AC/DC power supply selector circuit 3 is consisted of two transistors Q1 and Q2, and a relay 1. The relay 1 is a low power consumption type of relay, controlled to operate when the transistors Q1 and Q2 are electrically connected. The transistors Q1 and Q2 are controlled by the capacitor CA1 of the anterior AC/DC power supply detector circuit 2.

The AC/DC power supply pre-treating circuit 4 is consisted of an EMI prohibition circuit L1 and a rectifier circuit BD1. When an AC input voltage was detected at the input terminals L.N. contacts a and b and contacts c and d are respectively connected, causing the AC input voltage to be converted into a DC voltage for output. When a DC input voltage was detected at the input terminals L.N, contacts a and f and contacts c and g are respectively connected, permitting the DC input voltage to be directly transmitted to the DC power supply transformer circuit 5.

The DC power supply transformer circuit 5 is consisted of two transistor Q3 and Q4 and a transformer T1. Upon receiving of a PWM output signal from the feedback and regulating circuit 6, the transistors Q3 and Q4 produce an oscillation output signal to the DC output circuit 7 via the transformer T1. The main feature of the present DC power supply transformer circuit 5 is that the transformer T1 is commonly used for treating AC as well as DC power supply. Under the same output load but different input voltage (AC or DC), constant duty cycle is maintained. Therefore, false oscillation is eliminated.

The feedback and regulating circuit 6 is consisted of a variable resistor VR1, a voltage stabilizer ICB1, an optical coupling transistor P2, and an integrated circuit IC1. The variable resistor VR1 is to adjust its DC voltage output and give a reference voltage to the voltage stabilizer ICB1. The optical coupling transistor P2 gives an output signal to the integrated circuit IC1 to adjust the pulse width of its pulse wave output when the reference voltage from the variable resistor VR1 is higher than the voltage which connects the voltage stabilizer ICB1. The output pulse wave is sent to the transistors Q3 and Q4 through the PWM method, causing the transistors Q3 and Q4 to change their switching time, so as to produce different oscillating voltage output for regulating DC voltage output.

The DC output circuit 7 comprises a rectifier filter circuit to convert the AC voltage of the transformer T1 into a DC voltage for output.

Figure 3:
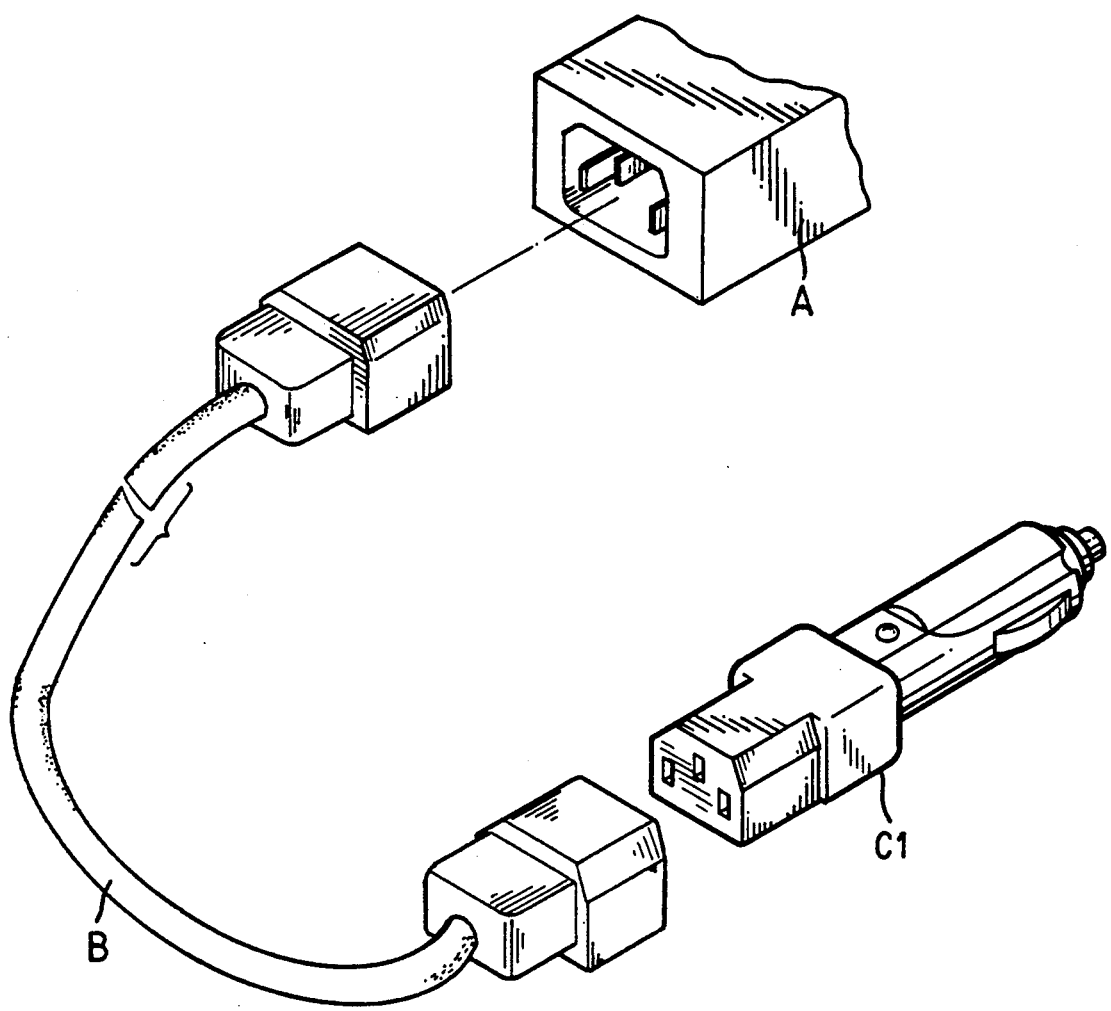
FIG. 3 is a schematic drawing showing an application of the present invention in obtaining a DC power supply from a car battery power supply.
Figure 4:
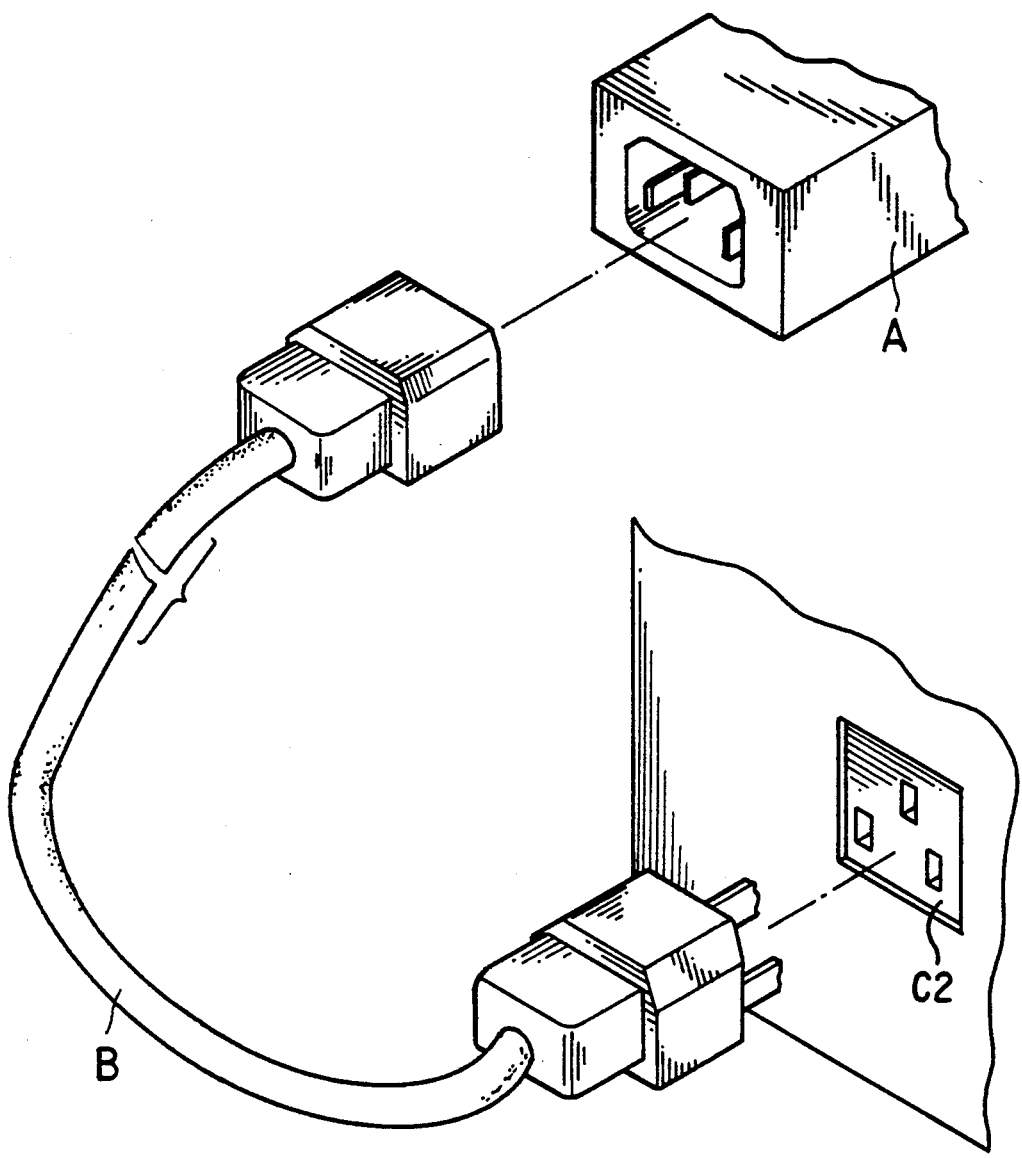
FIG. 4 is a schematic drawing showing another application of the present invention in obtaining an AC power supply from a wall type electric socket.

Referring to FIGS. 3 and 4, therein illustrated are application examples of the present invention used in connecting a car battery power supply or electric wall socket. A designates a power adapter of the present invention; B designates an extension cable; C1 designates the socket for cigarette lighter and an IEC three-wire socket adapter; C2 designates a regular wall type AC socket.

What is claimed is:

1. An electric power adapter comprising:
   an IEC three-wire socket connected to an AC power supply;
   an AC/DC power supply detector circuit to obtain an input power voltage from said IEC three-wire socket, said AC/DC power supply detector circuit comprised of a capacitor charging/discharging circuit consisted of transistors and capacitors and used in detecting the type of said input power voltage;
   an AC/CD power supply selector circuit, said AC/DC power supply selector circuit being consisted of two transistors and a relay, the transistors of said AC/DC power supply selector circuit being controlled by the potential at the capacitors of said AC/DC power supply detector circuit to energize said relay;
   an AC/DC power supply pre-treating circuit consisted of an EMI prohibition circuit and a rectifier circuit, said AC/DC power supply pre-treating circuit being controlled by said relay to directly transmit a DC power supply to a DC power supply transformer circuit or convert an AC power supply into a DC power supply for transmission to a DC power supply transformer circuit;
   a DC power supply transformer circuit comprised of a DC/AC converter circuit consisted of two transistor and a transformer, said DC power supply transformer circuit being to convert a DC voltage from said AC/DC power supply pre-treating circuit into an AC voltage for output to a DC output circuit;
   a feedback and regulating circuit consisted of a variable resistor, a voltage stabilizer, an optical coupling transistor and an integrated circuit, said variable resistor being to provide a reference voltage to said voltage stabilizer causing it to be electrically connected or disconnected, said optical coupling transistor being controlled by said voltage stabilizer to give an output signal to said integrated circuit causing it to change the pulse width of its pulse wave output to the transistors of said DC power supply transformer circuit so as to change output voltage; and
   a DC output circuit, said DC output circuit being consisted of a rectifier filter circuit used in converting the AC voltage from said DC power supply transformer circuit into a DC voltage for output and to produce a feedback voltage signal to said feedback and regulating circuit.

2. The electric power adapter of claim 1, wherein said AC/DC detector circuit is to detect a DC or AC power supply input by means of the effect that DC voltage causes a capacitor thereof to produce a high potential; the transient positive half-wave of AC voltage is not sufficient to causes the capacitor thereof to produce a high potential.

3. The electric power adapter of claim 1, wherein said relay of said AC/DC selector circuit is a relay of low power consumption having contacts for switching power voltage input.

4. The electric power adapter of claim 1, wherein said DC power supply transformer circuit uses a common transformer for treating AC and DC power supply, and maintains a constant duty cycle under same output load and different input voltage, so as to eliminate false oscillation.

* * * * *